(12) United States Patent
Zhang et al.

(10) Patent No.: US 10,468,956 B2
(45) Date of Patent: Nov. 5, 2019

(54) ELECTRICAL COMPONENT WITH MOVING MASS AND FLEXIBLE CABLES

(71) Applicant: Apple Inc., Cupertino, CA (US)

(72) Inventors: Yaocheng Zhang, Cupertino, CA (US); Kevin M. Froese, San Francisco, CA (US); Richard H. Dinh, San Jose, CA (US); Teodor Dabov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 579 days.

(21) Appl. No.: 15/016,644

(22) Filed: Feb. 5, 2016

(65) Prior Publication Data

US 2017/0229951 A1 Aug. 10, 2017

(51) Int. Cl.
*H02K 33/18* (2006.01)

(52) U.S. Cl.
CPC .................................... *H02K 33/18* (2013.01)

(58) Field of Classification Search
CPC ......... H05K 2201/51–2201/503; H05K 1/028; H05K 1/0281; H05K 1/0283; H05K 1/118; H05K 1/147; H02K 33/18
USPC .......................................................... 310/28
See application file for complete search history.

(56) References Cited

U.S. PATENT DOCUMENTS

| | | | |
|---|---|---|---|
| 8,288,899 B2 | 10/2012 | Park et al. | |
| 8,829,741 B2 * | 9/2014 | Park | B06B 1/045 |
| | | | 310/25 |
| 2005/0038944 A1 | 2/2005 | Harada et al. | |
| 2007/0058278 A1 * | 3/2007 | Nayak | G11B 5/00821 |
| | | | 360/55 |
| 2009/0231816 A1 * | 9/2009 | Lin | H05K 1/0281 |
| | | | 361/751 |
| 2010/0048264 A1 * | 2/2010 | Sato | H04M 1/0237 |
| | | | 455/575.4 |
| 2011/0198949 A1 * | 8/2011 | Furuich | H02K 33/16 |
| | | | 310/25 |
| 2011/0255250 A1 * | 10/2011 | Dinh | G03B 15/03 |
| | | | 361/749 |
| 2012/0119595 A1 * | 5/2012 | Choi | B06B 1/045 |
| | | | 310/25 |
| 2012/0153748 A1 * | 6/2012 | Wauke | H02K 33/16 |
| | | | 310/25 |
| 2012/0212895 A1 | 8/2012 | Cohen et al. | |

(Continued)

FOREIGN PATENT DOCUMENTS

WO 2015123361 8/2015

*Primary Examiner* — Terrance L Kenerly
(74) *Attorney, Agent, or Firm* — Treyz Law Group, P.C.; G. Victor Treyz; David K. Cole

(57) ABSTRACT

An electronic device may have an electrical component with a moving portion. The moving portion of the electrical component may include a moving mass and may include coils or other circuitry coupled to the moving mass. The moving mass may be supported within a support structure such as a housing structure. Springs may be coupled between walls in the housing structure and end portions of the moving mass. The coils or other circuitry on the moving mass may be coupled to flexible printed circuit cables. The flexible printed circuit cables may be coupled to the coils at the ends of the moving mass adjacent to the springs. The flexible printed circuit cables may have localized stiffeners that help prevent damage to metal traces in the cables during cable bending. The cables may have U-shapes or other suitable shapes.

18 Claims, 11 Drawing Sheets

(56) References Cited

U.S. PATENT DOCUMENTS

2013/0313919 A1\* 11/2013 Nakamura ............ H02K 33/00
　　　　　　　　　　　　　　　　　　　　　310/25
2014/0265650 A1　9/2014　Jeon
2016/0014915 A1　1/2016　Posner et al.

\* cited by examiner

ELECTRICAL COMPONENT WITH MOVING MASS AND FLEXIBLE CABLES

FIELD

This relates generally to electronic devices and, more particularly, to flexible circuit cables for electrical components with moving circuitry.

BACKGROUND

Electronic devices sometimes contain components with moving parts. For example, cellular telephones may contain vibrators that provide users with vibrating alerts. Vibrating alerts may be used to inform a user when an incoming telephone call has been received or when a timer has expired.

Vibrators contain moving masses that create vibrations when actuated using magnets and electromagnetic coils. To ensure reliable operation, a vibrator should be designed so that the vibrations associated with the use of the vibrator do not damage the circuitry of the vibrator. If care is not taken, a vibrator will not be sufficiently robust and may experience reliability issues.

SUMMARY

An electronic device may have an electrical component with a moving structure. The moving structure may include a moving mass and coils or other circuitry coupled to the moving mass. The moving mass may be supported within a support structure such as a housing structure.

Springs may be coupled between walls in the housing structure and end portions of the moving mass. The coils on the moving mass may be coupled to flexible printed circuit cables. The flexible printed circuit cables may be coupled to the coils at the ends of the moving mass adjacent to the springs.

Permanent magnets may be affixed to the housing structure. When current is applied to the coils through metal traces in the flexible printed circuit cables, the coils produce magnetic fields that interact with magnetic fields produced by the permanent magnets and cause the moving mass to vibrate.

The flexible printed circuit cables may have localized stiffeners that help prevent damage to metal traces in the cables during cable bending. The cables may have scissor shapes or other suitable shapes to enhance reliability.

Metal stiffeners may be welded to the moving mass and may be attached to the flexible printed circuit cables with heat activated film or other attachment mechanisms.

DETAILED DESCRIPTION

Electronic devices may be provided with electrical components having moving parts. The electrical components may be vibrators that include moving masses to generate vibrational alerts for users include electrical components such as electromagnetic coils through which current flows during operation. Dynamically flexing cables such as flexible printed circuit cables can be used to convey current to the electrical circuitry in the moving portion of an electrical component. Configurations in which flexible printed circuits are used to convey current to coils on a moving mass in a vibrator are sometimes described herein as an example. This is, however, merely illustrative. Electronic devices may, in general, be supplied with any suitable type of electrical component with a moving structure coupled to a flexing cable.

Figure 1:
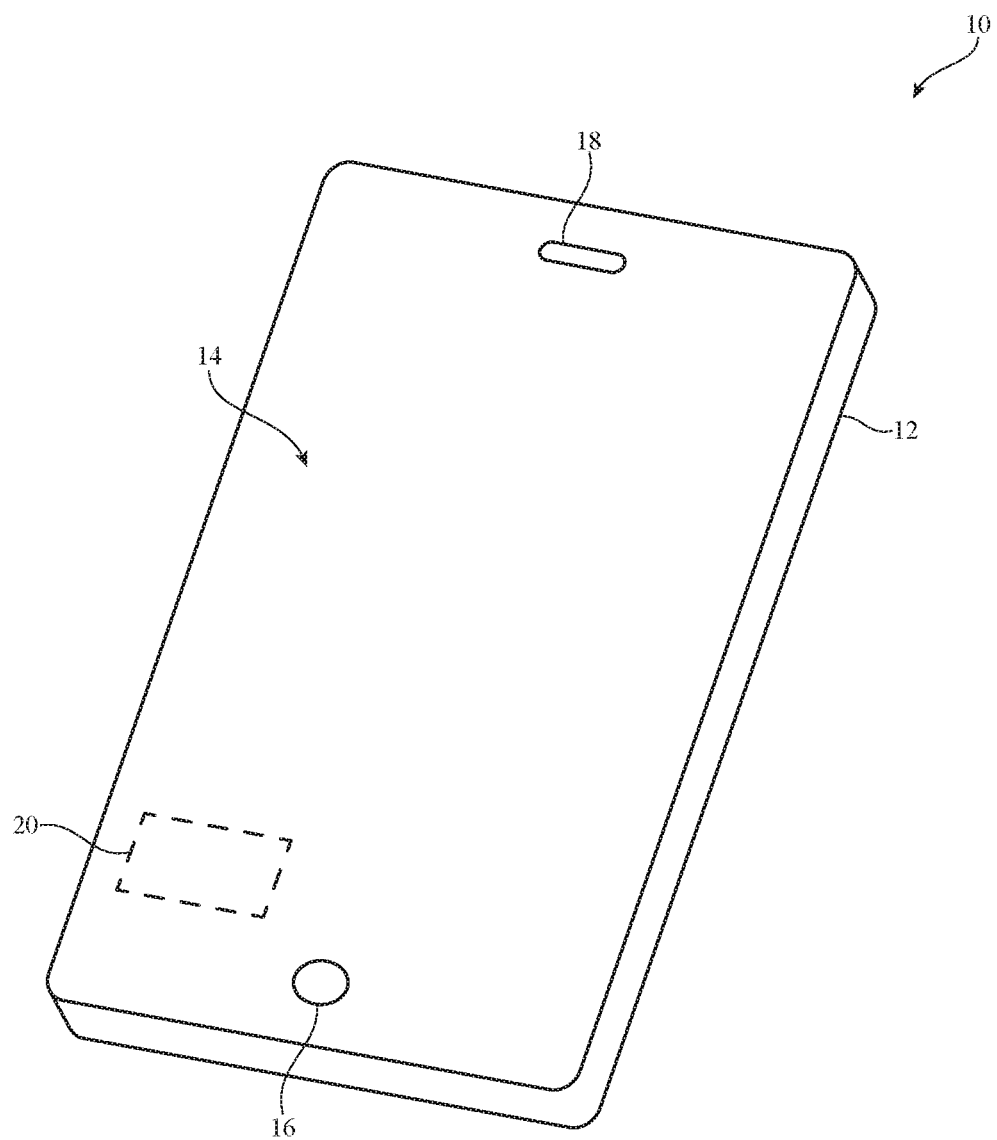
FIG. 1 is a perspective view of an illustrative electronic device in accordance with an embodiment.

FIG. 1 is a perspective view of an illustrative electronic device of the type that may include a vibrator or other component with a moving structure coupled to a flexing cable. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, an accessory (e.g., earbuds, a remote control, a wireless trackpad, etc.), or other electronic equipment. In the illustrative configuration of FIG. 1, device 10 is a portable device such as a cellular telephone, media player, tablet computer, wrist-watch device or other portable computing device. Other configurations may be used for device 10 if desired. The example of FIG. 1 is merely illustrative.

In the example of FIG. 1, device 10 includes display 14. Display 14 has been mounted in housing 12. Electronic device housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Openings may be formed in housing 12 to form communications ports, holes for buttons, and other structures.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads, other transparent conductive structures, or other touch sensor electrode structures.

Display 14 may include an array of pixels formed from liquid crystal display (LCD) components, an array of electrophoretic pixels, an array of plasma display pixels, an array of organic light-emitting diode pixels or other light-emitting diode pixels, an array of electrowetting pixels, or pixels based on other display technologies.

Display 14 may be protected using a display cover layer such as a layer of transparent glass, clear plastic, transparent ceramic, sapphire or other transparent crystalline material, or other transparent layer(s). The display cover layer may have a planar shape, a convex curved profile, a concave curved profile, a shape with planar and curved portions, a layout that includes a planar main area surrounded on one or more edge portions that are bent out of the plane of the planar main area, or other suitable shape. An opening may be formed in the display cover layer to accommodate ports such as speaker port 18.

One or more additional openings may also be formed in the display cover layer. For example, an opening may be formed in the display cover layer to accommodate a button such as button 16. Button 16 may be formed from a transparent button member that moves within the opening in the display cover layer. The button member may be circular, may be square, or may have other suitable shapes and may be formed from the same material as the display cover layer or other suitable materials. Other configurations may be used for display 14, if desired (e.g., button 16 may be formed from an integral region of the display cover layer, etc.).

To provide a user of device 10 with vibrational alerts, device 10 may be provided with one or more vibrators such as vibrator 20. Vibrator 20 may be located in housing 12 at the upper end of device 10, in the lower end of device housing 12 (as shown in FIG. 1), or may be located elsewhere in device 10. In configurations in which vibrator 20 is located at one of the ends of a device with an elongated housing such as housing 12 of device 10 of FIG. 1, the vibrational effects of vibrator 20 will have an enhanced impact, because the vibrator in these scenarios will be located away from the center of mass of device 10. In general, however, vibrator 20 may be located in any suitable portion of device 10. Vibrator 20 may be coupled to housing 12 using screws or other fasteners, adhesive, welds, mounting brackets, or other suitable attachment mechanisms.

Figure 2:
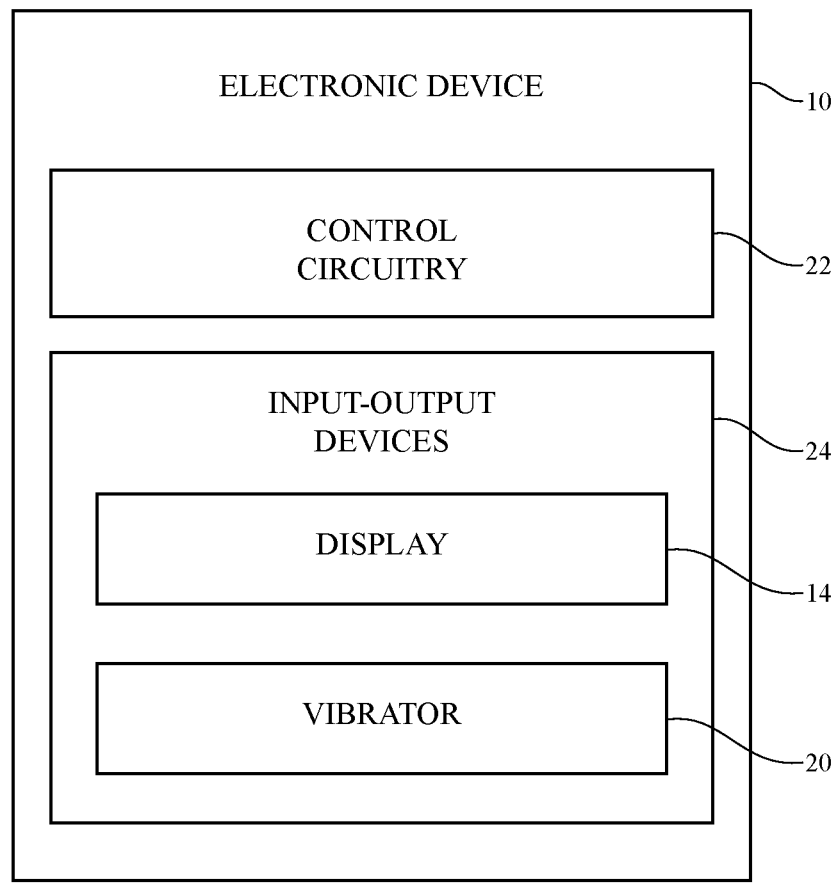
FIG. 2 is a schematic diagram of an illustrative electronic device with vibrator or other component with moving parts in accordance with an embodiment.

FIG. 2 is a schematic diagram of an illustrative electronic device with a vibrator. As shown in FIG. 2, electronic device 10 may have control circuitry 22. Control circuitry 22 may include storage and processing circuitry for supporting the operation of device 10. The storage and processing circuitry may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in control circuitry 22 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 24 may be used to allow data to be supplied to device 10 and to allow data to be provided from device 10 to external devices. Input-output devices 24 may include buttons such as button 16 and other buttons, joysticks, scrolling wheels, touch pads, key pads, keyboards, microphones, speakers (see, e.g., speaker 18), tone generators, vibrators such as vibrator 20 or other components with moving parts, cameras, sensors, light-emitting diodes and other status indicators, data ports, etc. A user can control the operation of device 10 by supplying commands through input-output devices 24 and may receive status information and other output from device 10 using the output resources of input-output devices 24. Input-output devices 24 may include one or more displays such as display 14.

Control circuitry 22 may be used to run software on device 10 such as operating system code and applications. During operation of device 10, the software running on control circuitry 22 may display images on display 14 using an array of pixels in display 14. The software running on control circuitry 22 may also supply current to vibrator 20 to cause vibrator 20 to vibrate. Vibrations may be produced by control circuitry 22 using vibrator 20 in response to incoming cellular telephone calls, in response to predetermined alarms, or in response to other suitable vibrator activation criteria.

Figure 3:
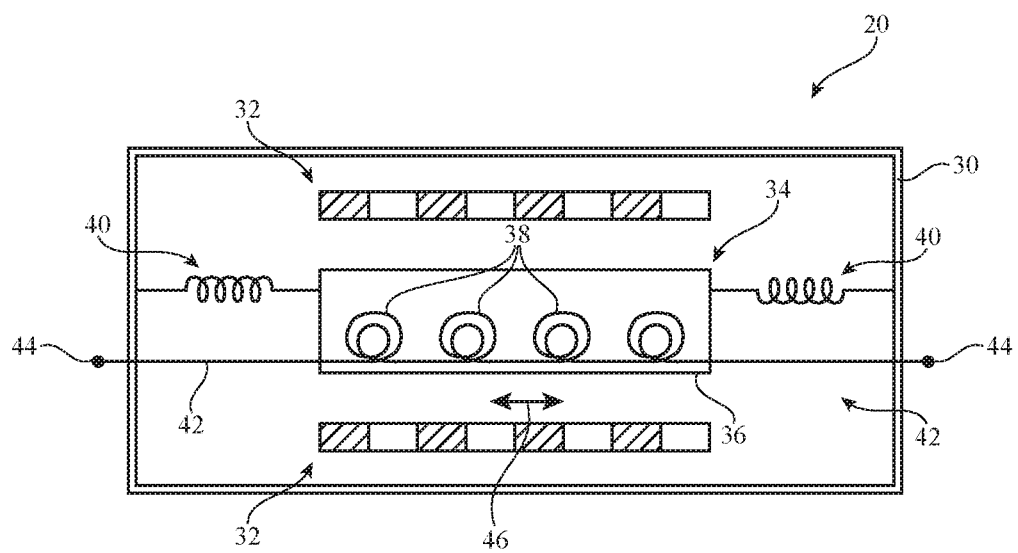
FIG. 3 is a diagram of an illustrative moving-coil vibrator in accordance with an embodiment.

FIG. 3 is a diagram of an illustrative vibrator of the type that may be used in device 10. As shown in FIG. 3, vibrator 20 may have a support structure such as housing 30. Magnets 32 may be mounted in a fixed position relative to housing 30. Magnets 32 may, for example, be permanent magnets that are attached to the walls of housing 30 using adhesive, using mounting brackets, using recesses formed as integral portions of housing 30, or using other suitable mounting structures.

Vibrator 20 may have movable structures such as moving mass assembly 34. Moving mass assembly may be received within housing 30 and may be located between magnets 32. Assembly 34 may include moving mass 36. Moving mass 36 may be formed from a bar of metal such as a bar of tungsten or other heavy material. Wire coils 38 may be attached to moving mass 36. For example, coils 38 may be glued into place within recesses in moving mass 36 using adhesive or may be attached to moving mass 36 using other suitable attachment mechanisms.

Coils 38 may be coupled in series between first and second respective vibrator terminals 44. When it is desired to produce vibrations with vibrator 20, control circuitry 22 may supply current to coils 38 through terminals 44. This causes coils 38 to produce magnetic fields that interact with the magnetic fields produced by permanent magnets 32 and thereby vibrate moving mass assembly 34 back and forth in directions 46.

Moving mass assembly 34 may be suspended between the walls of housing 30 or other support structures in vibrator 20 using springs 40. Springs 40 may be flat springs, coil springs, serpentine springs, or other suitable springs. Configurations in which springs 40 are flat springs that are bent (i.e., configurations in which springs 40 are leaf springs) may sometimes be described herein as an example. Springs 40 may be formed from spring metal (e.g., spring steel) or other suitable flexible springy material.

Terminals 44 of vibrator 20 may be coupled to coils 38 using flexible cables 42. Flexible cables 42 are bent back and forth repeatedly during operation of vibrator 20 (e.g., flexible cables 42 may be dynamically flexed at frequencies of 100 Hz to 1000 Hz, at frequencies above 100 Hz, or at frequencies below 1000 Hz), so flexible cables 42 are preferably formed from bendable cable structures that are reliable when bent numerous times. With one suitable arrangement, which may sometimes be described herein as an example, flexible cables 42 may be formed from flexible printed circuit substrates (i.e., cables 42 may be flexible printed circuits). Configurations in which cables 42 are formed from other structures (e.g., flexible wires, etc.) may also be used. The use of flexible printed circuits to form signal paths for coupling terminals 44 to coils 38 is merely illustrative.

Figure 4:
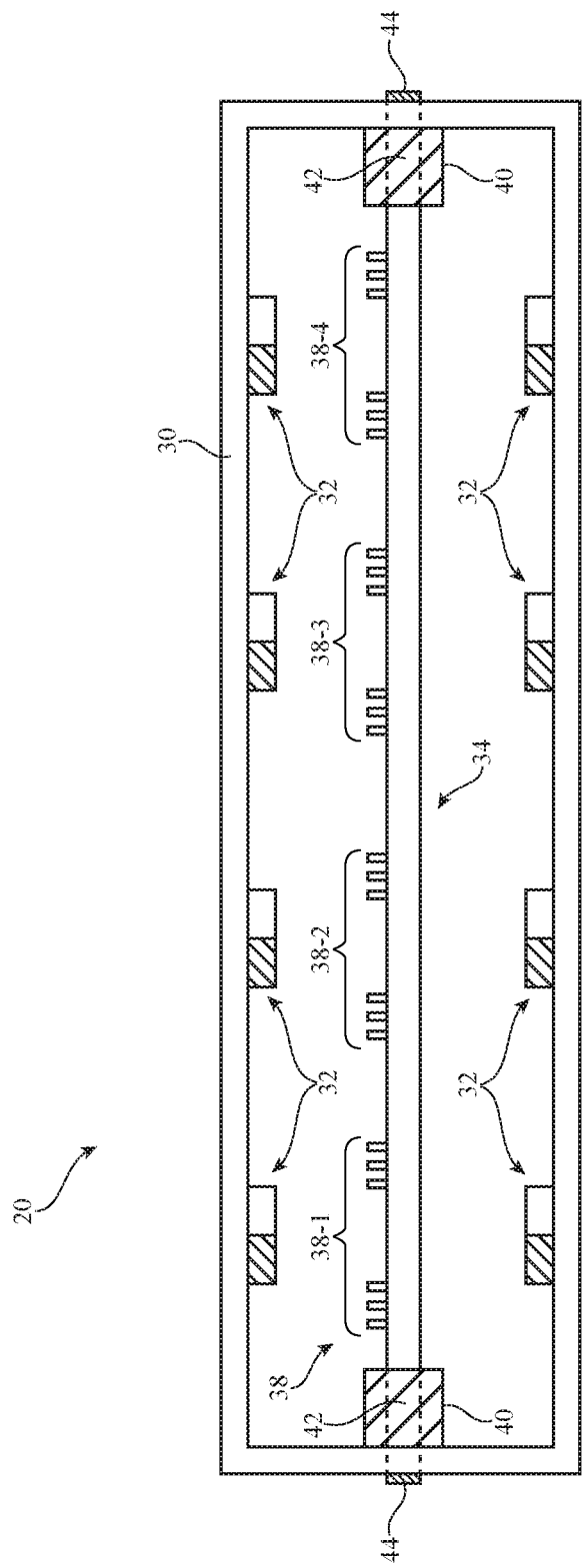
FIG. 4 is a cross-sectional side view of an illustrative vibrator in accordance with an embodiment.

A cross-sectional side view of an illustrative moving-coil vibrator that has flexible printed circuit cables 42 for coupling terminals 44 to coils 38 is shown in FIG. 4. As show in FIG. 4, coils 38 (e.g., first coil 38-1, second coil 38-2, third coil 38-3, and fourth coil 38-4 in the example of FIG. 4) may be mounted to moving mass 36 and may be suspended between housing walls at opposing ends of housing 30 using springs 40. There may be any suitable number of loops of conductive material (conductive lines) in moving mass assembly 34. The use of an arrangement with four coils 38 in FIG. 4 is illustrative. Each coil 38 may have one or more turns, two or more turns, three or more turns, or four or more turns (as examples).

Control circuitry 22 (FIG. 2) may be coupled to terminals 44 of vibrator 20 to supply vibrator 20 with control signals. First and second flexible printed circuit cables 42 at respective first and second opposing ends of moving mass assembly 34 may run in parallel with first and second springs 40 at the first and second ends of moving mass assembly 34 and may extend through the walls of housing 30 to electrically connect the ends of coils 38 to respective terminals 44 on the exterior of housing 30.

Figure 5:
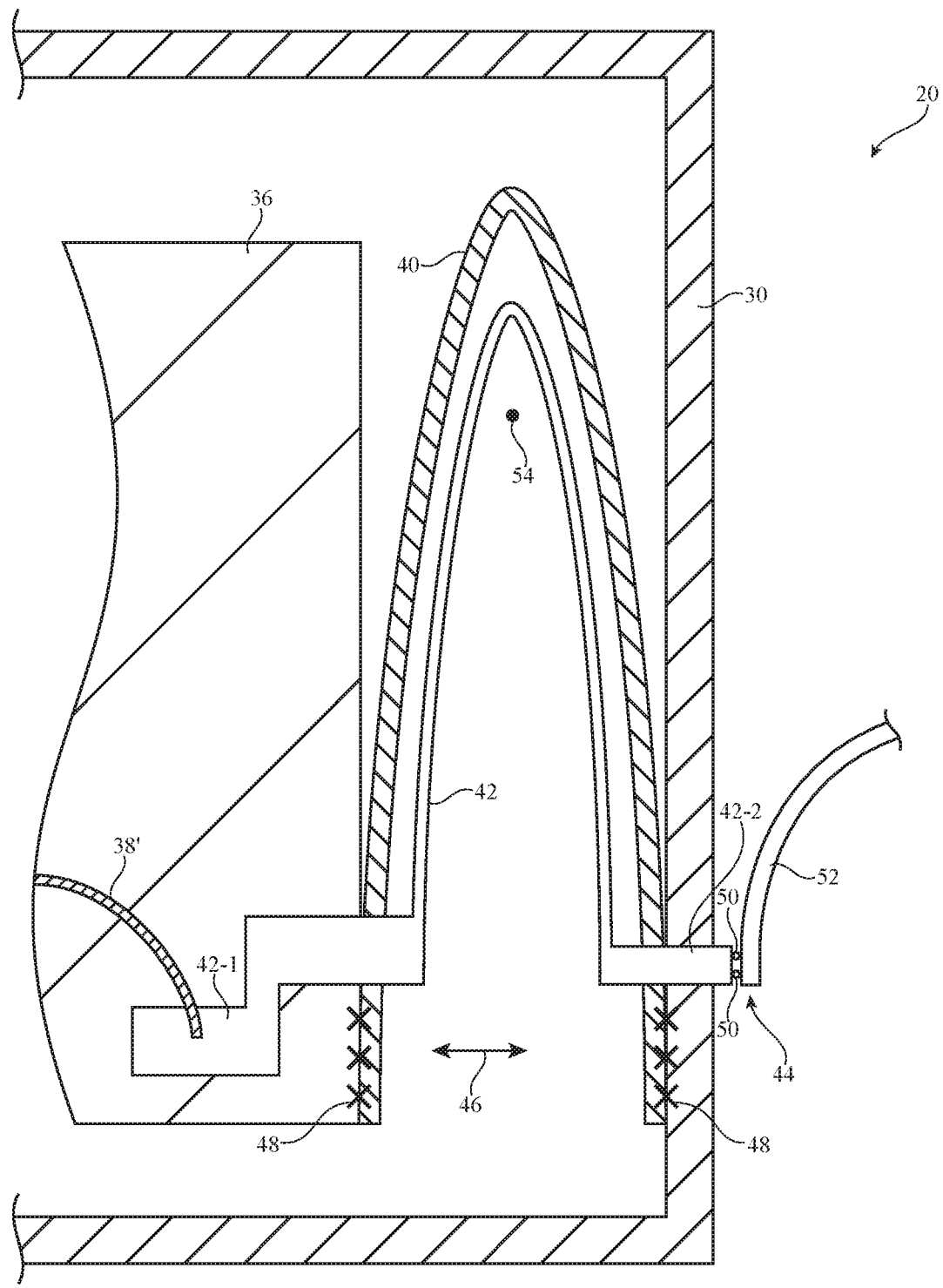
FIG. 5 is a cross-sectional top view of an end portion of an illustrative vibrator in accordance with an embodiment.

FIG. 5 is a top view of an illustrative end portion of vibrator 20 showing how flexible printed circuit cable 42 and associated spring 40 may have bent shapes. This allows each flexible printed circuit cable 42 to be nested within a respective spring 40. As shown in FIG. 5, spring 40 may be coupled between moving mass 36 and housing 30 using connections 48. Vibrator housing (support structure) 30 may be formed from plastic, metal, other materials, or combinations of these materials. Connections 48 may be welds (e.g., when coupling metal structures together), may include fasteners, and/or may include adhesive or other attachment structures.

Flexible printed circuit cable 42 of FIG. 5 may have a first end such as end 42-1 that is coupled to coil wire 38' of coils 38 on moving mass 36 and an opposing second end such as end 42-2 that serves as part of terminal 44. End 42-2 may be coupled to signal paths on a structure such as external flexible printed circuit 52 using solder 50 or other conductive coupling mechanisms. Signal lines in flexible printed circuit cable 52 or other signal paths may be used to couple terminal 44 to control circuitry 22. During operation of vibrator 20, moving mass 36 moves in directions 46 and flexible printed circuit cable 42 and spring 40 will flex about axis 54.

Figure 6:
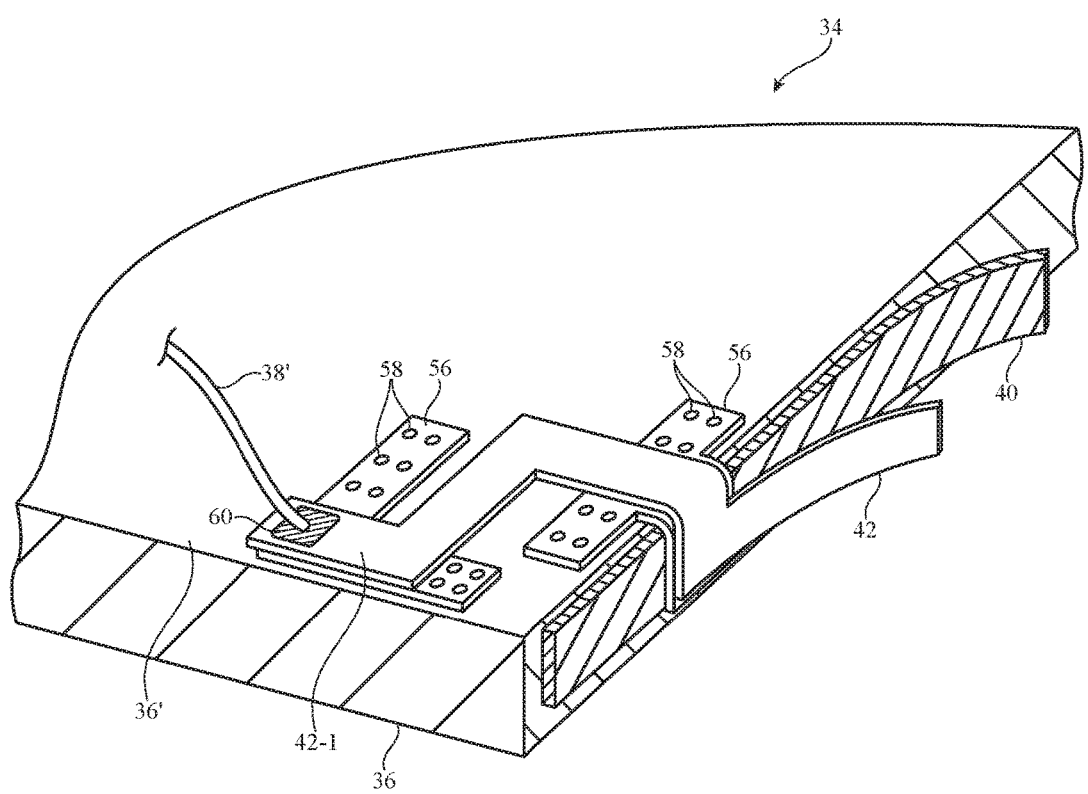
FIG. 6 is a perspective view of a moving mass for a vibrator in accordance with an embodiment.

A perspective view of an illustrative end portion of moving mass assembly 34 is shown in FIG. 6. As shown in FIG. 6, one or more flexible printed circuit stiffeners such as stiffeners 56 may be attached to moving mass 36. Stiffeners 56 may be formed from stainless steel sheet metal (e.g., sheet metal with a thickness of 0.1 mm or other suitable thickness) and may be attached to flexible printed circuit 42 using an adhesive such as heat activated film or other attachment mechanisms. Stiffeners 56 may be attached to upper surface 36' of moving mass 36 using laser welds 58 or other attachment mechanisms (adhesive, fasteners, crimped connections, etc.). An end portion of coil wire 38' of coils 38 may be coupled to a solder pad formed from a metal trace in flexible printed circuit cable 42 at end 42-1 using solder 60.

Figure 7:
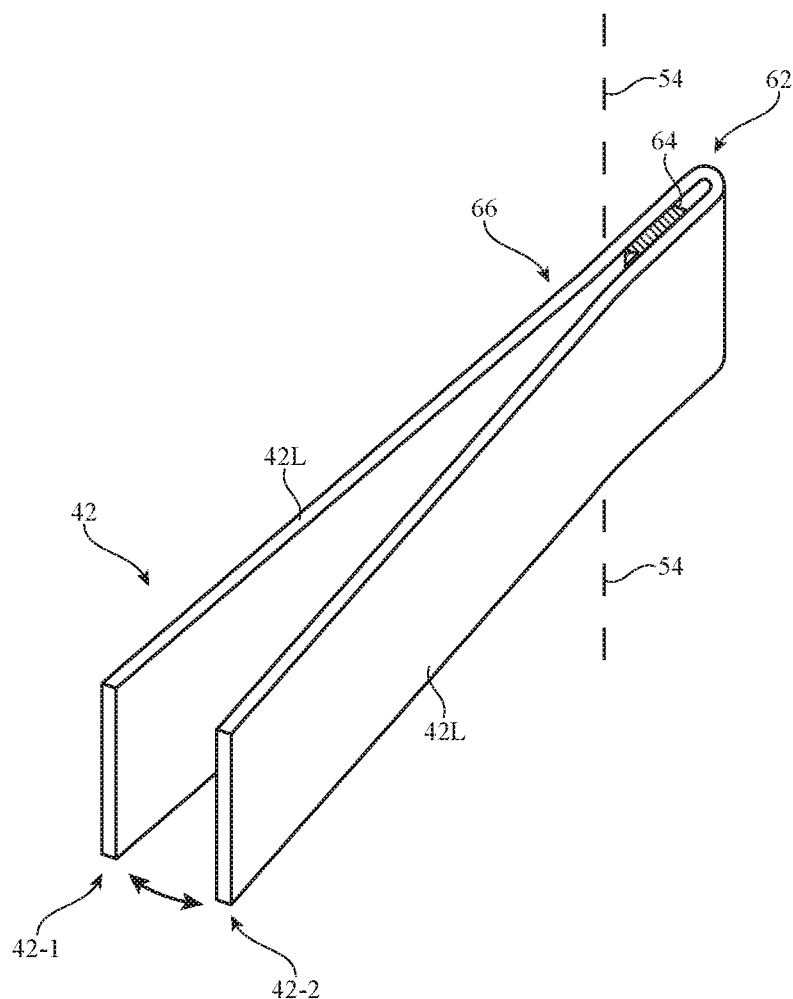
FIG. 7 is a perspective view of an illustrative flexible printed circuit cable that may be used to couple coils on a moving mass to a fixed terminal on a support structure such as a vibrator housing in accordance with an embodiment.

An illustrative configuration for flexible printed circuit cable 42 is shown in FIG. 7. Cable 42 may contain a metal trace such as a layer of copper or other metal (e.g., high fatigue limit copper) and may contain substrate layer(s) of flexible polymer such as sheet(s) of polyimide or other flexible dielectric layers. The metal trace in cable 42 may carry current to coils 38 in moving mass assembly 34. The metal trace may be formed on the outer surface of the flexible printed circuit (e.g., the trace may be formed on top of a layer of polyimide or other flexible printed circuit substrate layer) or may be embedded between flexible polymer layers (e.g., the trace may be embedded between upper and lower polyimide layers or other flexible printed circuit substrate layers). Other configurations (e.g., configurations involving multiple layers of metal traces, metal traces with vias, etc.) may be used in forming flexible printed circuit cable 42, if desired.

With a configuration of the type shown in FIG. 7, cable 42 may be formed from a single rectangular strip of flexible printed circuit substrate material. The strip of flexible printed circuit material that makes up cable 42 may be bent about axis 54 at bent end 62 to form two elongated legs 42L. Coupling material 64 may be placed between portions of the inwardly facing surfaces of legs 42L adjacent to end 62 and bend axis 54. This holds the legs 42L in the bent region of cable 42 together and helps transfer stress from bent end 62 towards ends 42-1 and 42-2 of legs 42L (i.e., stress is transferred from end 62 towards region 66). By reducing localized stress at end 62, the maximum amount of stress imparted on the metal trace in cable 42 may be reduced, thereby reducing the risk of crack formation in the metal trace and enhancing reliability. Spring 40 may have a rectangular strip shape with a bend about axis 54 (i.e., spring 40 may have a leaf-spring shape that matches that of illustrative printed circuit cable 42 of FIG. 7) or may have other suitable shapes.

Figure 8:
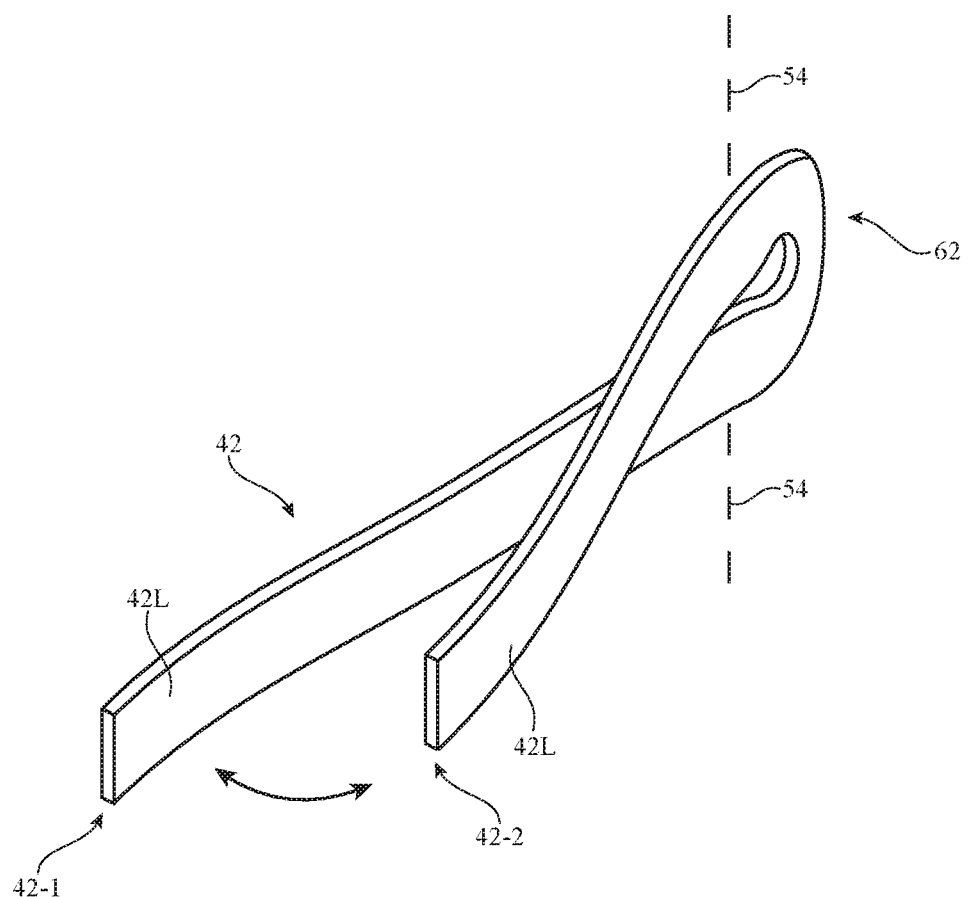
FIG. 8 is a perspective view of an illustrative scissor shaped flexible printed circuit cable for a vibrator in accordance with an embodiment.

If desired, flexible printed circuit cable 42 may have a scissor shape, as shown in FIG. 8. With the illustrative configuration of FIG. 8, legs 42L may separate from each other when the portion of cable 42 at end 62 twists about axis 54 (i.e., cable 42 has a U shape with legs that bend out of the plane of the U). The scissor shape of flexible printed circuit cable 42 of FIG. 8 may help reduce stress on the metal trace (e.g., the copper trace) of cable 42 and may allow flexible printed circuit 42 to withstand a large number of high-frequency cycles (e.g., 100 million cycles at 100-1000 Hz or more). Due to the scissor shape of cable 42, legs 42L will not touch each other during flexing of legs 42 about axis 54. The thickness of cable 42 may be 50-100 microns, more than 25 microns, less than 200 microns, or other suitable thickness. The metal trace in cable 42 may have a thickness of 10-100 microns, less than 40 microns, more than 10 microns, or other suitable thickness. The metal trace in cable 42 may span 50% of the width of cable 42, 10-90% of the width of cable 42, more than 20% of the cable width, or less than 80% of the cable width.

Figure 9:
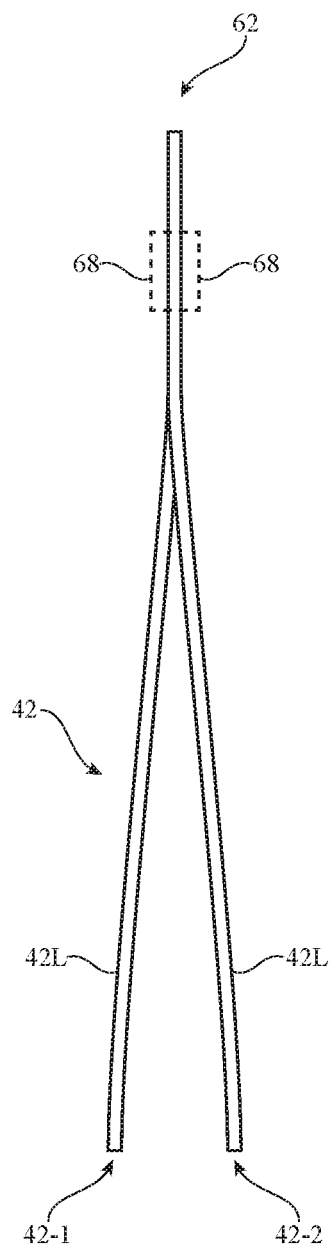
FIG. 9 is a top view of the illustrative flexible printed circuit of FIG. 8 in accordance with an embodiment.

As shown in the illustrative top view of scissor-shaped flexible printed circuit cable 42 in FIG. 9, cable 42 may be provided with one or more local stiffening structures such as stiffening layers 68. Stiffeners such as layers 68 may be formed from layers of polyimide, cured adhesive layers, metal layers, or other layers that locally enhance the stiffness of cable 42. Stiffeners 68 may be provided on selected portions of cable 42 in the vicinity of bend axis 54 at end 62 to help move stress outwardly along the lengths of legs 42L and thereby enhance cable reliability.

Figure 10:
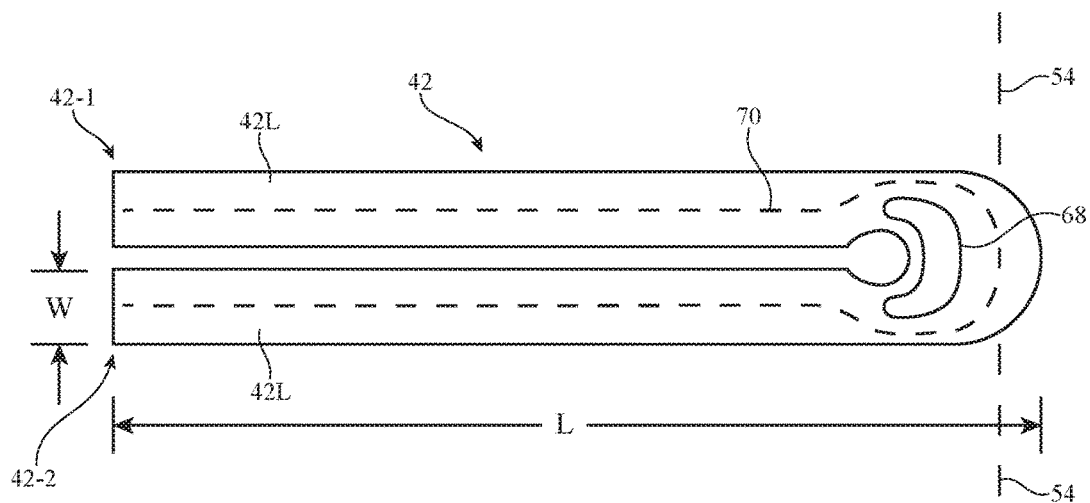
FIG. 10 is a side view of the illustrative flexible printed circuit of FIGS. 8 and 9 in accordance with an embodiment.

FIG. 10 is a side view of scissor-shaped flexible printed circuit cable 42 of FIGS. 8 and 9 in an illustrative configuration in which metal trace 70 of cable 42 is routed around stiffeners 68 and is not overlapped by stiffeners 68. As shown in FIG. 10, the elongated strip of flexible printed circuit material that makes up cable 10 may be characterized by a width W (i.e., legs 42L may each have a width W). Each leg 42L may be also be characterized by a length L. Width W may be 0.7 mm, may be 0.2 to 1.5 mm, may be more than 0.4 mm, or may be less than 1 mm (as examples). Length L may be 10 mm, may be 1-15 mm, may be more than 3 mm, may be less than 20 mm, or may be any other suitable length.

Figure 11:
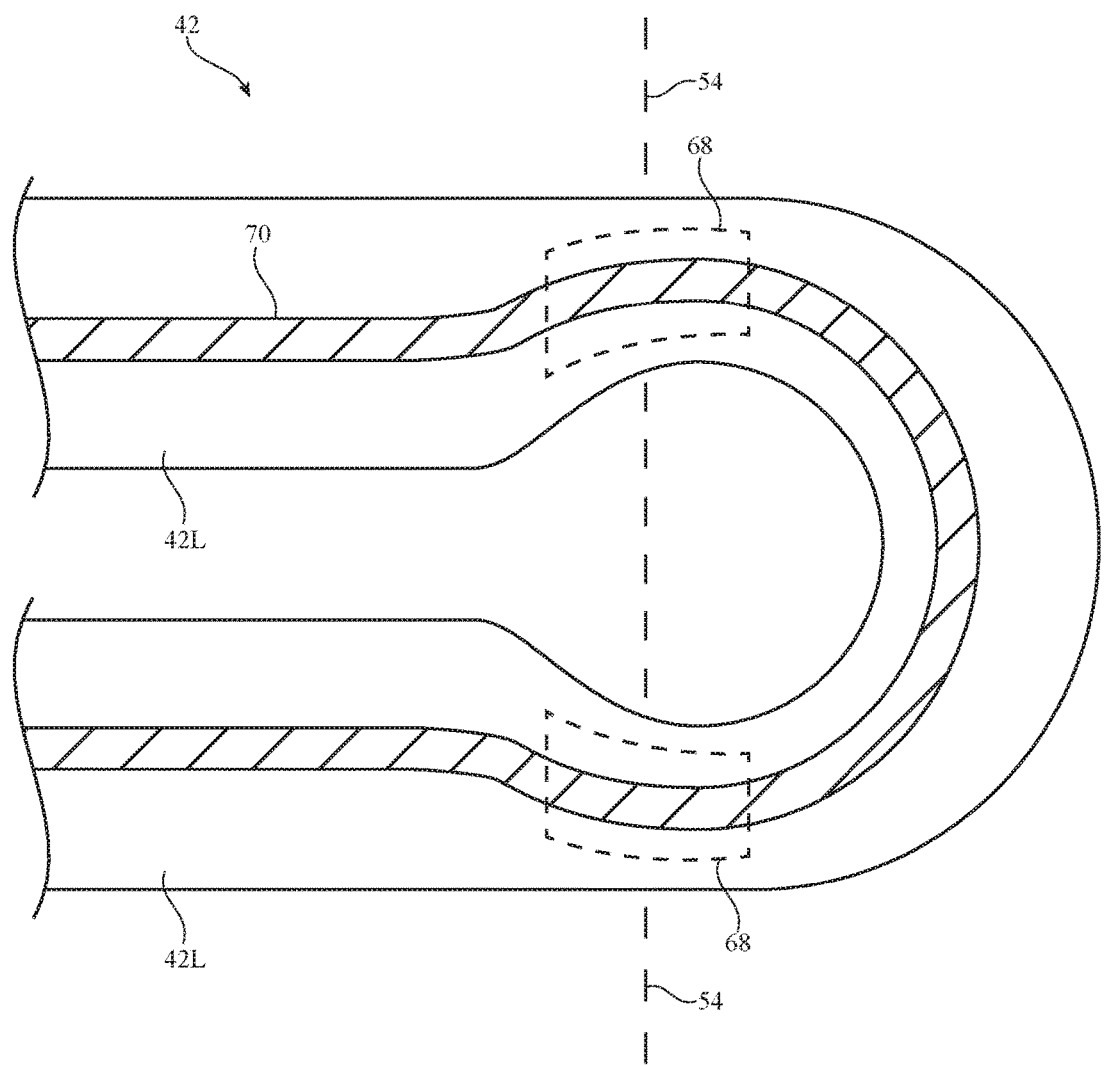
FIG. 11 is a side view of an end portion of a flexible printed circuit cable having stress-spreading localized stiffeners that overlap selected portions of a metal signal trace in accordance with an embodiment.

If desired, stiffeners 68 may overlap metal trace 70, as shown in the illustrative configuration of FIG. 11. Arrangements in which one stiffener 68 overlaps trace 70 and another stiffener does not overlap trace 70 or in which stiffener 68 extends along larger portions of cable 42 may also be used. The configurations of FIGS. 10 and 11 are merely illustrative.

Although sometimes described in the context of a moving mass assembly in a component such as a vibrator, flexible printed circuit cables such as cable 42 may be used to couple a moving portion of any suitable electric component to terminals on a non-moving support structure or other stationary part of the component. For example, scissor-shaped cables and other cables 42 may be used to couple together moving and stationary portions of speakers, cameras, buttons, sensors, and other components. The use of flexible printed circuit cables 42 at the ends of a moving mass assembly with coils in an electromagnetic vibrator component is merely illustrative.

The foregoing is merely illustrative and various modifications can be made by those skilled in the art without departing from the scope and spirit of the described embodiments. The foregoing embodiments may be implemented individually or in any combination.

What is claimed is:

1. An electrical component, comprising:
   a housing comprising first and second opposing surfaces;
   a first magnet coupled to the first surface;
   a second magnet coupled to the second surface;
   a moving mass assembly within the housing, wherein the moving mass assembly is interposed between the first and second magnets and moves parallel to the first and second opposing surfaces, wherein the moving mass assembly has a first side and a second side that extends from the first side at a non-zero angle;
   a flexible printed circuit cable that is coupled to the first side of the moving mass assembly, wherein the flexible printed circuit cable bends around an axis;
   a spring that is coupled to the housing and the second side of the moving mass assembly; and
   a stiffener that selectively stiffens a portion of the flexible printed circuit cable and that overlaps the axis.

2. The electrical component defined in claim 1 wherein the spring is formed from metal.

3. The electrical component defined in claim 1 wherein the moving mass assembly includes a moving mass and at least one coil on the moving mass.

4. The electrical component defined in claim 3 wherein the flexible printed circuit is coupled to the coil.

5. The electrical component defined in claim 1 wherein the flexible printed circuit cable has a scissor shape with two legs.

6. The electrical component defined in claim 1 wherein the flexible printed circuit cable includes a metal trace that is overlapped by the stiffener.

7. The electrical component defined in claim 1 wherein the flexible printed circuit cable includes a metal trace that is not overlapped by the stiffener.

8. The electrical component defined in claim 1 further comprising coils in the moving mass assembly that receive current through the flexible printed circuit cable.

9. Apparatus, comprising:
   a support structure having first and second surfaces, wherein the first surface extends from the second surface at a non-zero angle;
   a moving mass that moves relative to the support structure, wherein the moving mass has a first side and a second side that extends from the first side at a non-zero angle;
   a spring coupled to the first side of the moving mass and the first surface of the support structure;
   a magnet mounted to the second surface of the support structure;
   circuitry supported by the moving mass;
   a U-shaped flexible printed circuit cable having a first end coupled to the first surface of the support structure and an opposing second end coupled to the circuitry on the second side of the moving mass, wherein the U-shaped flexible printed circuit cable is nested within a portion of the spring that is interposed between the moving mass and the support structure;
   a stiffener that selectively stiffens a portion of the U-shaped flexible printed circuit and that is attached between the first end and the moving mass; and
   a metal trace that is routed around the stiffener.

10. The apparatus defined in claim 9 wherein the moving mass comprises a metal bar.

11. The apparatus defined in claim 10 further comprising an additional stiffener that is attached between the first end and the metal bar.

12. The apparatus defined in claim 9 wherein the circuitry comprises a plurality of coils of wire.

13. A vibrator, comprising:
   a housing;
   a metal bar that vibrates within the housing;
   a first spring having a first segment coupled to a first end of the metal bar and a second segment coupled to the housing;
   a second spring coupled between an opposing second end of the metal bar and the housing;
   a first flexible printed circuit formed from a first substrate coupled between the first end of the metal bar and the housing, wherein a portion of the first flexible printed circuit is interposed between the first segment and the second segment of the first spring, and wherein the first and second segments of the first spring are interposed between the first end of the metal bar and the housing; and
   a second flexible printed circuit formed from a second substrate coupled between the second end of the metal bar and the housing.

14. The vibrator defined in claim 13 further comprising permanent magnets mounted to the housing.

15. The vibrator defined in claim 14 further comprising coils on the metal bar, wherein current passes from a first metal trace on the first flexible printed circuit to the coils on the metal bar and from the coils on the metal bar to a second metal trace on the second flexible printed circuit.

16. The vibrator defined in claim 15 wherein the first and second flexible printed circuits comprise U-shaped flexible printed circuits.

17. The vibrator defined in claim 15 wherein the springs comprise steel and wherein the first and second flexible printed circuits flex about respective first and second axes and wherein the first and second flexible printed circuits include stiffeners that selectively stiffen the first and second flexible printed circuits adjacent to the respective first and second axes.

18. The vibrator defined in claim 13 wherein the second flexible printed circuit is nested within the second spring.

* * * * *